US012770181B2

(12) United States Patent
Locke

(10) Patent No.: US 12,770,181 B2
(45) Date of Patent: Oct. 20, 2026

(54) ELECTRONIC TABLE MAT

(71) Applicant: Digital Drink Dispensers Limited, Bath (GB)

(72) Inventor: Ian Matthew Locke, Hilperton (GB)

(73) Assignee: DIGITAL DRINK DISPENSERS LIMITED, Bath (GB)

( * ) Notice: Subject to any disclaimer, the term of this patent is extended or adjusted under 35 U.S.C. 154(b) by 220 days.

(21) Appl. No.: 18/023,263

(22) PCT Filed: Aug. 18, 2021

(86) PCT No.: PCT/EP2021/072884
§ 371 (c)(1),
(2) Date: Feb. 24, 2023

(87) PCT Pub. No.: WO2022/043146
PCT Pub. Date: Mar. 3, 2022

(65) Prior Publication Data

US 2023/0325905 A1 Oct. 12, 2023

(30) Foreign Application Priority Data

Aug. 28, 2020 (GB) ...................................... 2013565

(51) Int. Cl.
*G06Q 30/0601* (2023.01)
*A47G 23/03* (2006.01)
(Continued)

(52) U.S. Cl.
CPC ..... *G06Q 30/0635* (2013.01); *A47G 23/0303* (2013.01); *A47G 23/0309* (2013.01);
(Continued)

(58) Field of Classification Search
CPC .... G06Q 50/12; G06Q 20/3276; G08B 5/226; G08B 21/02; G08B 21/0461; G08B 5/36; G08C 17/02
(Continued)

(56) References Cited

U.S. PATENT DOCUMENTS 7,366,512 B1 4/2008 Kefalas et al.
9,312,924 B2 * 4/2016 Ozaki ..................... H02J 50/12
(Continued)

FOREIGN PATENT DOCUMENTS

CN 102379612 A 3/2012
CN 204654502 U 9/2015
(Continued)

OTHER PUBLICATIONS

Examination Report in Application GB2111802.1, Jan. 23, 2024.

*Primary Examiner* — Olusegun Goyea
(74) *Attorney, Agent, or Firm* — Ware, Fressola, Maguire & Barber LLP

(57) ABSTRACT

An ordering system (1101) comprises a plurality of electronic table mats (101) and a user terminal (1102) comprising a wireless communication device (1108) for communicating with a wireless communication network (1106). Each electronic table mat (101) comprises a body (102) having first and second faces (103, 104) and supporting an electronic system (105) that comprises: a display device (301), a data processor (304) with access to data storage (305) and for controlling a visual output displayed by the display device (301), a wireless communication device (306) for communicating with a wireless communication network (1106), an input device (307), and a power device (310). Each electronic table mat (101) is configured for two-way communication with the user terminal (1102) via the wireless network (1106), with each electronic table mat (101) being associated with a unique identifier. A method (1201)
(Continued)

of use of the ordering system (1101). An electronic table mat (101).

19 Claims, 8 Drawing Sheets

(51) Int. Cl.
*G06Q 20/20* (2012.01)
*G06Q 20/32* (2012.01)
*G06Q 20/34* (2012.01)

(52) U.S. Cl.
CPC ......... *G06Q 20/208* (2013.01); *G06Q 20/325* (2013.01); *G06Q 20/34* (2013.01)

(58) Field of Classification Search
USPC ................................ 705/15; 455/567, 456.3
See application file for complete search history.

(56) References Cited

U.S. PATENT DOCUMENTS

| | | | | |
|---|---|---|---|---|
| 9,406,220 | B2 * | 8/2016 | Proud | A61B 5/002 |
| 9,432,758 | B1 * | 8/2016 | Kirk | H04R 1/028 |
| 9,760,798 | B2 * | 9/2017 | Kumar | G06V 10/56 |
| 9,864,405 | B2 * | 1/2018 | Trachtenberg | G06F 1/1626 |
| 9,983,049 | B2 * | 5/2018 | Kumar | G01G 17/04 |
| 10,295,400 | B2 * | 5/2019 | Wallace | G08B 5/226 |
| 10,757,184 | B2 * | 8/2020 | Haebler | H04L 67/1044 |
| 10,757,451 | B2 * | 8/2020 | Pujia | H04N 21/4223 |
| 10,809,698 | B2 * | 10/2020 | Keenan | G05B 19/4097 |
| 10,867,502 | B1 * | 12/2020 | Makley | G06V 20/52 |
| 10,880,517 | B2 * | 12/2020 | Mazzarella | H04W 4/14 |
| 11,441,938 | B2 * | 9/2022 | Dixon, Jr. | B65D 25/02 |
| 11,910,943 | B2 * | 2/2024 | König | A01K 1/035 |
| 2006/0052983 | A1 | 3/2006 | Vock | |
| 2008/0005947 | A1 * | 1/2008 | Barna | A63B 69/3661 40/629 |
| 2010/0213895 | A1 * | 8/2010 | Keating | H02J 50/12 320/108 |
| 2010/0289341 | A1 * | 11/2010 | Ozaki | H02J 50/12 307/104 |
| 2010/0312385 | A1 | 12/2010 | Deuber | |
| 2012/0190386 | A1 * | 7/2012 | Anderson | H04W 4/021 455/456.3 |
| 2013/0137490 | A1 * | 5/2013 | Quehl | G08B 5/36 73/296 |
| 2014/0317934 | A1 * | 10/2014 | Kramer | G01G 21/22 30/123 |
| 2015/0095168 | A1 * | 4/2015 | Zises | G06Q 50/12 705/15 |
| 2015/0193844 | A1 | 7/2015 | Logan et al. | |
| 2016/0174744 | A1 * | 6/2016 | Bawden | A47G 23/0306 108/50.11 |
| 2016/0275576 | A1 | 9/2016 | Logan | |
| 2016/0369990 | A1 | 12/2016 | Anderson | |
| 2017/0169672 | A1 * | 6/2017 | Farrow | G06K 7/10366 |
| 2017/0213104 | A1 * | 7/2017 | Kumar | G06F 16/5854 |
| 2017/0219416 | A1 * | 8/2017 | Kumar | G01G 19/52 |
| 2017/0374311 | A1 * | 12/2017 | Trachtenberg | G09F 9/30 |
| 2018/0130147 | A1 * | 5/2018 | Hahn | G06Q 50/12 |
| 2018/0253775 | A1 * | 9/2018 | Zises | G06Q 20/3276 |
| 2018/0333612 | A1 * | 11/2018 | Davis | G08C 17/02 |
| 2019/0063988 | A1 * | 2/2019 | Wallace | G01G 19/52 |
| 2019/0130727 | A1 * | 5/2019 | Wu | G08B 21/02 |
| 2019/0303864 | A1 | 10/2019 | Edwards et al. | |
| 2020/0314388 | A1 * | 10/2020 | Kramer | B60R 1/24 |
| 2020/0336864 | A1 * | 10/2020 | Huang | H04W 76/11 |
| 2021/0038001 | A1 * | 2/2021 | Nieraad | A47G 23/0306 |

FOREIGN PATENT DOCUMENTS

| | | | |
|---|---|---|---|
| CN | 105640256 | A | 6/2016 |
| CN | 107224165 | A | 10/2017 |
| CN | 106805685 | B | 3/2018 |
| CN | 110111174 | A | 8/2019 |
| CZ | 26805 | U | 4/2014 |
| DE | 202006003621 | U1 | 6/2006 |
| DE | 102007013150 | A1 | 9/2008 |
| EP | 2311536 | A1 | 4/2011 |
| EP | 3203418 | A1 | 8/2017 |
| GB | 2488572 | A | 9/2012 |
| JP | H02104310 | A | 4/1990 |
| JP | 2005258949 | A | 9/2005 |
| JP | 2011076270 | A | 4/2011 |
| JP | 2016015071 | A | 1/2016 |
| JP | 2020187404 | A | 11/2020 |
| WO | WO01/41107 | A | 6/2001 |
| WO | 2017130431 | A1 | 8/2017 |
| WO | WO2019/141852 | A1 | 7/2019 |
| WO | 2020125838 | A1 | 6/2020 |

* cited by examiner

ELECTRONIC TABLE MAT

FIELD OF THE INVENTION

The present invention relates to an electronic table mat, in particular to an electronic beverage coaster. More specifically, the present invention relates to an electronic beer mat that incorporates data processing and display functionality.

BACKGROUND OF THE INVENTION

It is known for food and drink to be sold in various outlets, such as in cafes, restaurants, public houses, hotels, nightclubs, shopping arcades, market places, food and drink vans and stalls, cinemas and other entertainment venues, and at service stations and tourist attractions. Beverages may be served hot or cold, and may be non-alcoholic or contain some alcohol.

Often, retail environments offering such refreshments provide seating or bar areas for persons to consume purchased products. Different places may provide a more formal, or a more informal, setting for eating and drinking.

Licensed premises typically have a bar, from which drinks and other goods can be ordered, and an area in which furniture such as tables, chairs, ledges and stools are provided for patrons to use at their leisure. Information about products available for purchase may be presented in different formats, for example in a menu, which may be available on request or already set out for customer use, displayed on a notice board, such as a chalkboard, or in advertising materials, such as pump clips.

Some functional items found in such establishments that display advertising and/or information include bar towels and beer mats, which have a purpose of absorbing drips and protecting surfaces.

In modern times, business operators have been looking at ways to improve customer experience. Approaches include making existing service functions more seamless, for example streamlining ordering and payment processes, and introducing new ways to engage with the consumer, for example through promotional activities and loyalty schemes. Beer mats are commonly fabricated from paperboard, which may be plastic-laminated, although other materials may be used. A beer mat typically carries branding and/or promotional messages. These may be associated with the particular establishment and/or a product available from the establishment and/or a product of service that may be of interest to people visiting the establishment.

United Kingdom Patent No. GB 2521750 B discloses a point-of-sale display system for use by a beverage vendor, comprising: at least one draught beverage dispenser, a plurality of point-of-sale display apparatus, each comprising an electronic device that comprises a display screen and a data processor with access to data storage for controlling content presented by the display screen, a wireless communicator configured to communicate with a wireless communication network, and a user terminal configured to communicate with each individual electronic device via said wireless communication network. The point-of-sale display system is designed to allow a retail outlet operative to change the content presented by the display screen quickly and easily.

It is an object of the present invention to present content to a person within an establishment in which products are served to consumers at the point at which the product will be consumed by the person rather than at the point from which the product is supplied.

By way of a specific example, with reference to public houses, it is an object to present content to a person at the location they have settled to drink a beverage rather than at the bar from which the beverage was dispatched.

SUMMARY OF THE INVENTION

The present invention provides an ordering system. The ordering system comprises a plurality of electronic table mats, such as a plurality of beverage coasters, and a user terminal comprising a wireless communication device for communicating with a wireless communication network; each of the electronic table mats comprises: a body having a first face, for placing onto a support surface, and a second face, onto which an item can be placed; and an electronic system supported by the body, the electronic system comprising: a display device comprising at least one display output element, a data processor with access to data storage and for controlling a visual output displayed by the display device; a wireless communication device for communicating with a wireless communication network; an input device comprising at least one input element; and a power device; and each of the electronic table mats is configured for two-way communication with said user terminal via said wireless network, with each said electronic table mat being associated with a unique identifier.

The display device of each electronic table mat may comprise a display panel having touchscreen functionality.

The user terminal may comprise a display panel having touchscreen functionality.

A display panel of the electronic table mat and/or the user terminal may have multiple input regions.

The electronic system of each electronic table mat may further comprise a sensing device comprising at least one sensing element. The sensing device may be a weight sensor. The weight sensor may be usable to detect the presence of a drinking vessel, such as a glass, on the electronic table mat and may be useable to detect an extent of fullness/emptiness thereof.

The electronic system of each electronic table mat may comprise an audio output device.

The power device of each electronic table mat may comprise a rechargeable battery. The ordering system may then further comprise an electronic table mat charging device, which may be configured for charging two or more of the electronic table mats simultaneously.

Each electronic table mat may have a shape that is generally square or generally circular.

Each electronic table mat may comprise at least one illumination arrangement. The illumination arrangement may comprise a plurality of LED lamps.

In an example. at least a first of the plurality of electronic table mats and a second of the plurality of second electronic table mats are configured to communicate by means of a wireless connection between them.

In an example, at least one electronic table mat is configured to communicate with the user terminal via a communication hub device that comprises a wireless communication device for communicating with a wireless communication network.

In an example, the ordering system is configured to allow each electronic table mat to be managed from the user terminal, the ordering system allowing remote content management of each electronic table mat, wherein the remote content management allows content to be presented by each electronic table mat to be added, modified or deleted using the user terminal.

In an example, the order 1105*ing* system is usable in a method that comprises the steps of:

associating a payment card with an individual one of the plurality of electronic table mats, via the user terminal; wirelessly communicating data relating to an input received by the said individual electronic table mat from that said electronic table mat to the user terminal; and wirelessly communicating data from the user terminal to that said electronic table mat.

An electronic table mat usable in the ordering system and/or the method is also provided.

Further particular and preferred aspects of the invention are set out in the accompanying dependent claims.

BRIEF DESCRIPTION OF THE DRAWINGS

The present invention will now be more particularly described, with reference to the accompanying drawings, in which.

DESCRIPTION

Examples are described below, with reference to the accompanying drawings, in sufficient detail to enable those of ordinary skill in the art to implement the apparatus, systems and/or processes described herein. However, it is to be understood that the invention is not limited to the precise examples described and/or shown and that various changes and modifications can be effected by one skilled in the art without departing from the scope of the invention as defined by the appended claims.

In the following description, all orientational terms, such as upper, lower, radially and axially, are used in relation to the drawings and should not be interpreted as limiting the scope of the invention as defined by the appended claims unless the context clearly indicates otherwise.

The drawings are not necessarily drawn to scale, and in some instances the drawings may have been exaggerated or simplified for illustrative purposes only.

Unless otherwise defined, all terms (including technical and scientific terms) used herein are to be interpreted as is customary in the art. In addition, features referred to herein in the singular can number one or more, unless the context clearly indicates otherwise. Similarly, the terms “comprises”, “comprising”, “includes”, “including”, “has” and/or “having” when used herein, specify the presence of the stated feature or features and do not preclude the presence or addition of one or more other features, unless the context clearly indicates otherwise.

An electronic table mat will now be described. In a specific example, the electronic table mat is a beverage coaster. In an alternative example, the electronic table mat is a place mat.

In an embodiment, a digital beer mat is provided.

Figure 1:
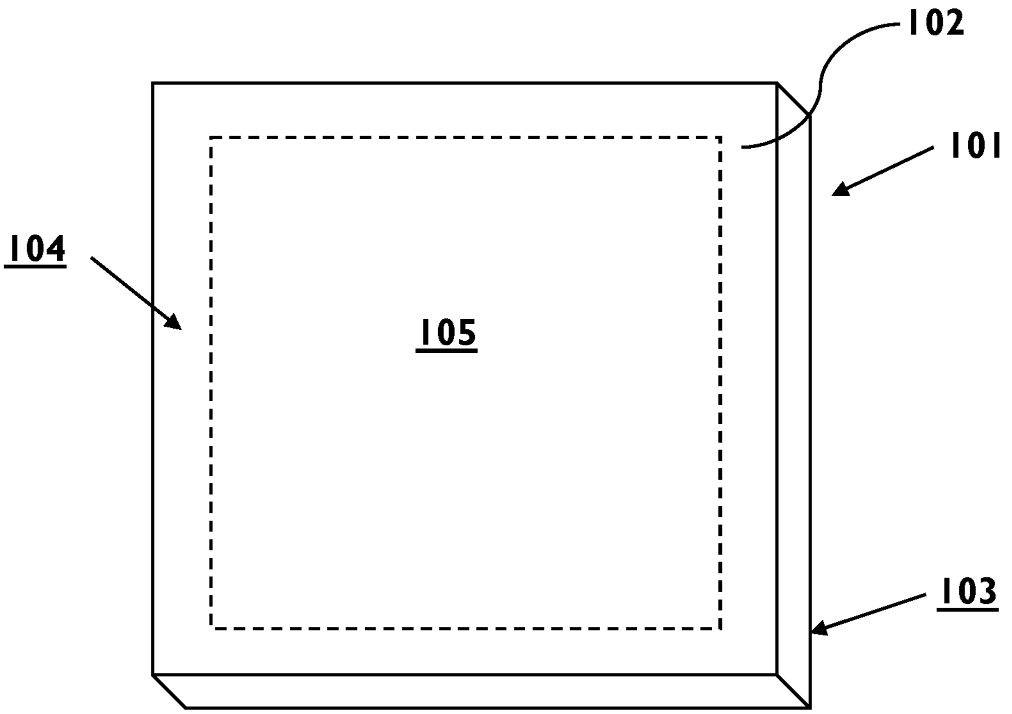
FIG. 1 shows an electronic table mat.

An electronic table mat 101 is shown in FIG. 1. The electronic table mat 101 comprises a body 102. The body 102 has a first face 103, for placing onto a support surface (not shown in this Figure), and a second face 104, onto which an item (not shown in this Figure) can be placed. As will be described in further detail below, the electronic table mat 101 comprises an electronic system, indicated generally at 105.

Figure 2:
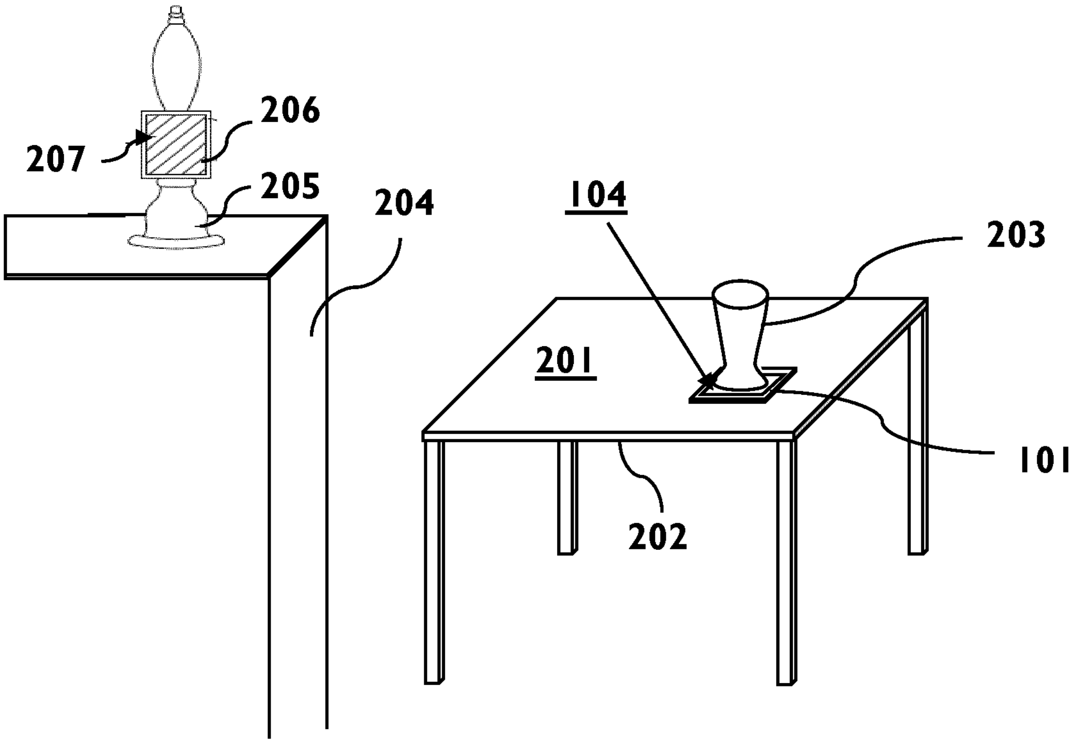
FIG. 2 illustrates an example use of the electronic table mat of FIG. 1.

As illustrated in FIG. 2, the electronic table mat 101 is usable a beverage coaster. The electronic table mat 101 has been placed on a support surface 201, in the shown scenario the top of a table 202, and a beverage receptable 203, in the shown scenario a drinking glass, has been placed upon the electronic mat 101. As also shown, the first side 103 of the electronic table mat 101 is facing downwards, towards the table 202, and the second side 104 of the electronic table mat 101 is facing upwards, away from the table 202. The beverage receptable 203 is shown upon the second side 104 of the electronic table mat 101.

The scenario shown in FIG. 2 is that of a public house, in which there is a bar 204 with at least one draught beverage dispenser, such as hand-pump dispenser 205. As is customary in the trade, hand-pump dispenser 205 supports a pump clip 206 that presents a visual display 207 containing product/brand information relating to the beverage currently associated with the hand-pump dispenser 205. Typically, a person will go to the bar 204 to place an order, and will then either wait at the bar 204 while the order is being fulfilled, or will wait somewhere away from the bar 204, such as table 202, for the order to be brought to them.

As will be described in further detail, the electronic table mat 101 provides benefits to a person in such an establishment.

Figure 3:
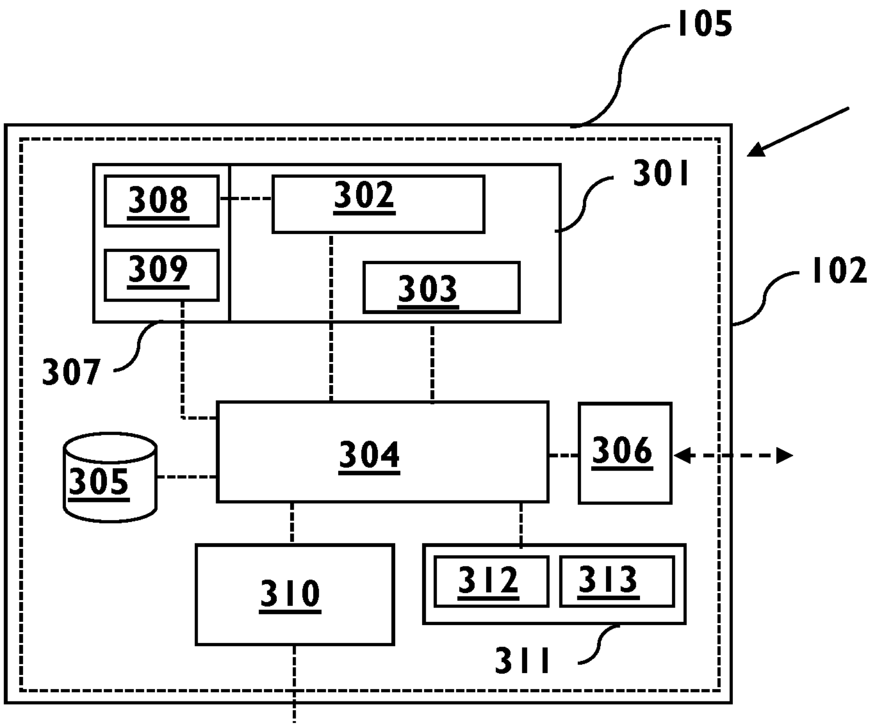
FIG. 3 shows a schematic of the electronic table mat of FIG. 1.

A schematic of electronic table mat 101 is shown in FIG. 3.

The body 102 of the electronic table mat 101 may take any suitable form. In an example, the body 102 comprises a housing, preferably a waterproof housing.

The electronic table mat 101 comprises a display device 301. The display device 301 comprises at least one display output element, for example first display output element 302. In this shown example, the display device 301 comprises a plurality of display output elements, and therefore also comprises second display output element 303. The display device 301 may however comprise further display output elements or may comprise only one display output element.

The or each display output element may comprise any suitable type of display output element. In examples in which the display device comprises a plurality of display output elements, the plurality of display output elements may comprise different types of display output element. A display output element of the display device may comprise any suitable type of display panel, such as a liquid crystal display (LCD), light-emitting diode display (LED), flexible organic light-emitting diode (OLED) display, or electronic paper (e-Ink) display. A display panel of a display output element of the display device may have touchscreen functionality. A display panel of a display output element of the display device may have any suitable size and shape, and may be capable of displaying different display zones, each of which may cover any suitable proportion of the available display area. A display panel may have the capability of presenting static and/or moving text and images.

A display output element of the display device may alternatively comprise a lamp, for example an LED lamp, which is capable of emitting at least one colour of light, for example, white, red, blue and/or green, and is capable of emitting light in accordance with at least one pattern, for example continuous or flashing.

The electronic table mat 101 comprises a data processor 304 with access to data storage 305. The data processor 304 is suitably arranged for controlling a visual output displayed by the display device 301.

The data processor 304 and data storage 305 may take any suitable form, such as a micro-processor. In addition to primary storage (internal memory), the electronic table mat 101 may comprise one or more removable data storage device ports for secondary storage (expandable memory), such as a USB flash drive or a memory card.

The electronic table mat 101 comprises a wireless communication device 306. The wireless communication device 306 is suitably arranged for communicating with a wireless communication network. In a preferred embodiment, the wireless communication device 306 provides the capability of two-way data communication between the electronic table mat 101 and a wireless network. The wireless communication device 306 may be arranged to communicate with any suitable wireless network, for example a wireless local area network (WLAN) or a cellular network, using any suitable communication protocol. In an example, the wireless communication device comprises an NFC chip.

The electronic table mat 101 comprises an input device 307. The input device 307 comprises at least one input element, for example first input element 308. In this shown example, the input device 307 comprises a plurality of input elements, and therefore also comprises second input element 309. The input device 307 may however comprise further input elements or may comprise only one input element.

The or each input element may comprise any suitable type of input element. In examples in which the input device comprises a plurality of input elements, the plurality of input elements may comprise different types of input element. In an example, at least one input element in the form of a button is provided. In an example, the display device comprises a display panel having touchscreen functionality, and an input element of the input device is provided by a touch-sensitive region of the display panel.

The electronic table mat 101 comprises a power device 310. The power device 310 is suitably arranged for providing power to one or more of the other devices of the electronic system 105 (which include the display device 301, data processor 304, data storage 305, wireless communication device 306, and input device).

The power device 310 may be any suitable type. Preferably, the power device 310 comprises a rechargeable battery. The rechargeable battery may be configured for wired and/or wireless (inductive) charging. In an example, the power device 310 comprise a power supply socket for use in charging the rechargeable battery. The power supply socket may also provide data transfer capability.

It is to be appreciated that the electronic table mat device 101, in particular the electronic system 105, may be capable of one-way and/or two-way wired communication with another device and/or network.

It is to be understood also that the electronic table mat device 101, in particular the electronic system 105, may comprise further devices, for example an audio output device, such as a speaker.

In an embodiment, the devices of the electronic system 105, including the display device 301, data processor 304 with access to data storage 305, wireless communication device 306 and power device 310, are all supported by the body 102 of the electronic table mat device 101. In an example, each device of the electronic system 105 is at least partially housed within an interior of the body 102 of the electronic table mat 101.

It is further to be understood that the electronic table mat device 101 may comprise one or more additional electronic systems, which may provide other functionality, which may be complementary to the functionality provided by electronic system 105.

Optionally, and in this illustrated embodiment, the electronic system 105 comprises a sensing device 311. The sensing device 311 comprises at least one sensing element, for example first sensing element 312. In this shown example, the sensing device 307 comprises a plurality of sensing elements, and therefore also comprises second sensing element 313. The sensing device 311 may however comprise further sensing elements or may comprise only one sensing element.

The or each sensing element may comprise any suitable type of sensing element. In examples in which the sensing device comprises a plurality of input elements, the plurality of sensing elements may comprise different types of sensing element. In an example, at least one sensing element in the form of a weight sensor is provided. This may be used, for example, to monitor when a beverage receptable is nearly, or is, empty. This information may be used to prompt a change in content displayed by the electronic table mat. In the same or in an alternative example, at least one sensing element in the form of an accelerometer is provided. In the same or in an alternative example, at least one sensing element in the form of a gyroscope is provided.

Figure 4:
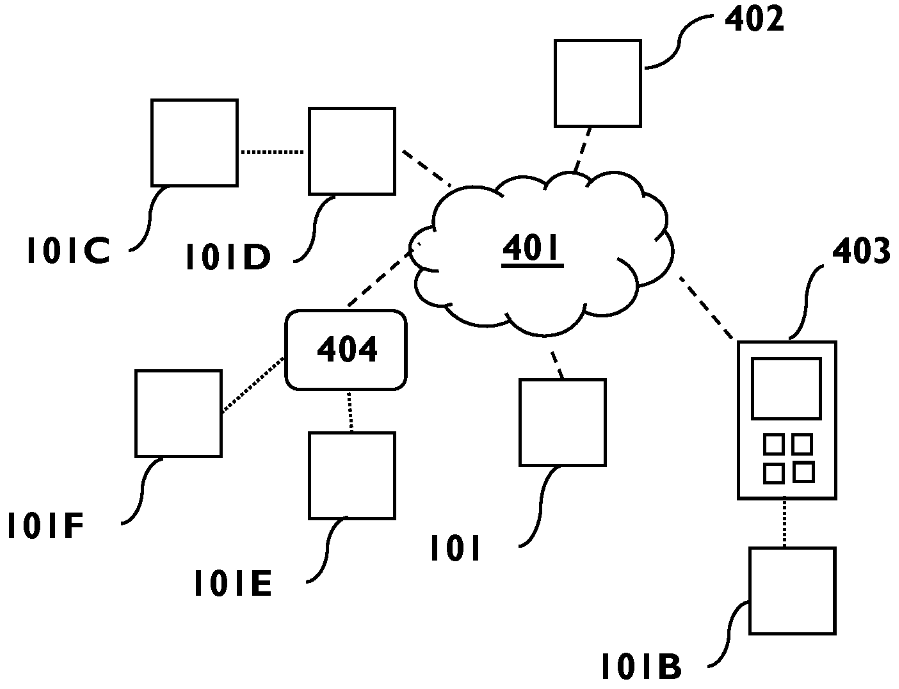
FIG. 4 the electronic table mat of FIG. 1 within a network.

FIG. 4 illustrates the electronic table mat 101 in communication with a wireless network 401. As shown, communication between the electronic table mat 101 and another electronic device 402 may be made via wireless network 401. The electronic device 402 may be associated with an ordering and/or payment system of a retail outlet (described further below). The electronic device 402 may be a user terminal of a content management system (described further below). An ordering and/or payment system of a retail outlet may be provided within, or for co-operation with a content management system.

Wireless communication may be made via a public network, or dedicated wireless connection (for increased security). In this arrangement, the electronic table mat 101 is connected directly to the wireless network 401.

For the purpose of illustrating connection possibilities, FIG. 4 also shows a second, third, fourth, fifth and sixth electronic table mat 101B, 101C, 101D, 101E and 101F respectively, each of which is like electronic table mat 101.

Illustrated is second electronic table mat 101B in wireless communication with a second electronic device 403, such as a mobile telephone, using near field communication (NFC).

The second electronic device 403 is shown in communication with wireless network 401. In this arrangement, the second electronic table mat 101B can communicate with the wireless network 401 via its NFC connection with the second electronic device 403. Using this set-up, a communication path between second electronic table mat 101B and electronic device 402 can be established. Thus, in this arrangement, the second electronic table mat 101B is connected indirectly to the wireless network 401.

Also illustrated is third electronic table mat 101C in communication with fourth electronic table mat 101D, via a Bluetooth connection, and the fourth electronic table mat 101D in communication with wireless network 401. Thus, in this arrangement, the third electronic table mat 101C is connected indirectly to the wireless network 401 and the fourth electronic table mat 101D in connected directly to the wireless network 401.

Further illustrated is fifth and sixth electronic table mats 101E, 101F in communication with a third electronic device 404, such as a communication hub device comprising a wireless communication device for communicating with a wireless communication network. In this example, the fifth and sixth electronic table mats 101E, 101F are in communication with a third electronic device 404, via an NFC connection, for example, and the third electronic device 404 in communication with wireless network 401. In this arrangement, both the fifth and the sixth electronic table mats 101E, 101F are connected indirectly to the wireless network 401.

Hence, it is to be appreciated that, depending on the connectivity capability that an electronic table mat as described herein is provided with, the electronic table mat may be able to connect wirelessly to a communications network directly or indirectly.

Figure 5:
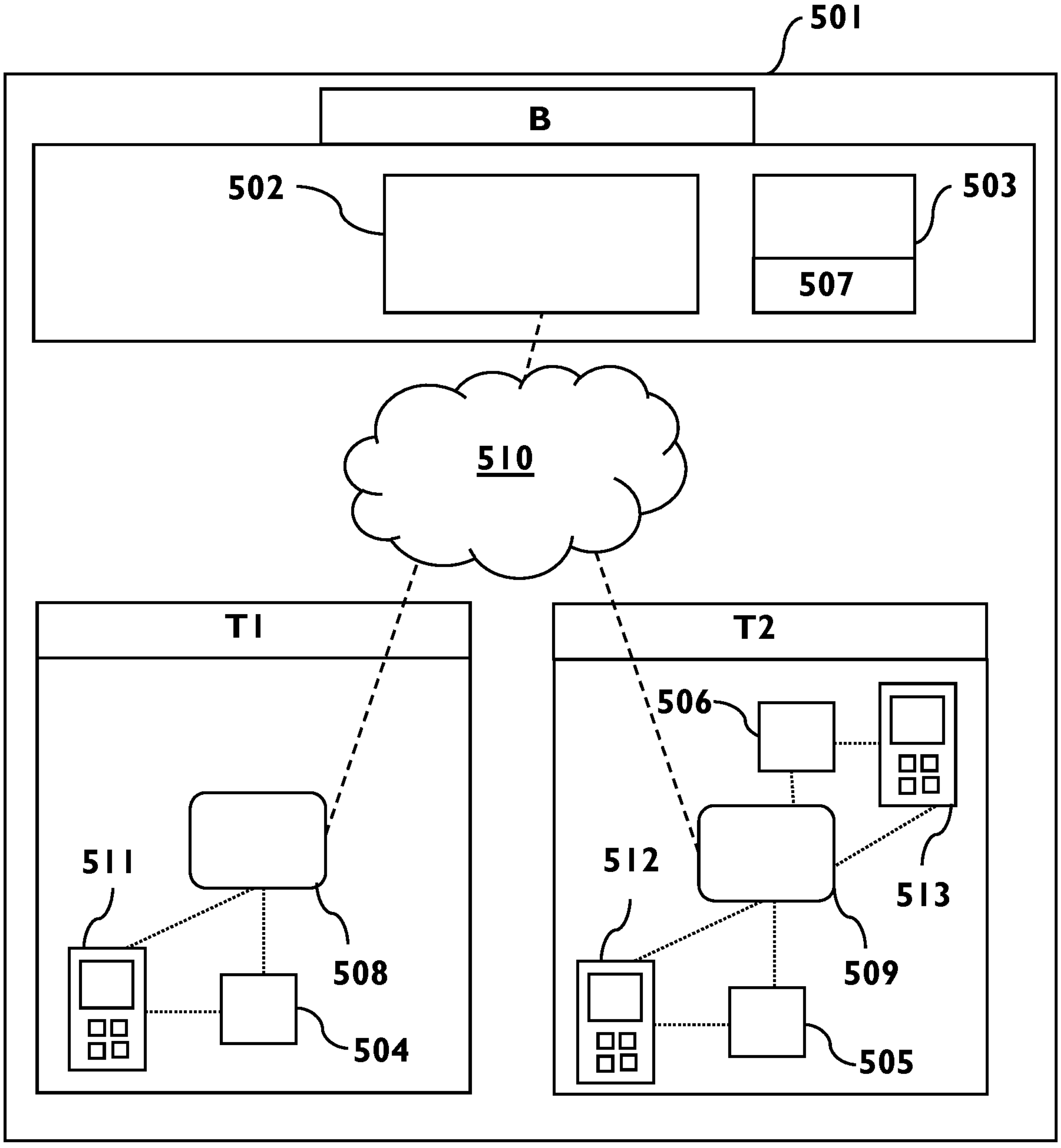
FIG. 5 illustrates an example scenario in which the electronic table mat of FIG. 1 may be used.

Turning now to FIG. 5, example uses of an electronic table mat as described herein will be illustrated with reference to the scenario of a pub 501 having a bar B and tables T1, T2.

Associated with the pub 501 is an ordering and payment system, indicated generally at 502. The pub 501 also has an electronic table mat system, indicated generally at 503, which comprises a plurality of electronic table mats as described herein, including electronic table mats 504, 505 and 506. In this illustrated scenario, the electronic table mat system 503 also comprises at least one docking station, such as docking station 507, at which the electronic table mats can normally be kept and charged as required. In this illustrated scenario also, the electronic table mat system 503 further comprises at least one communication hub device, such as communication hub devices 508 and 509. The pub 501 has access to a wireless network 510. The electronic table mat system 503 is designed to interact with the ordering and payment system 502.

To use the electronic table mat system 503 a user is first associated with a particular electronic table mat. This may be achieved in one of a number of possible different ways.

According to one option, a person approaches the bar B, their payment details are registered within the ordering and payment system 502, and those registered payment details are linked to an electronic table mat 504 and/or communication hub device 508 that the person can use at table T1. With this option, a bar person may hand over an electronic table mat to the customer. This enables the bar person to check that the electronic table mat is clean and in good working order before being used by the customer.

Alternatively, a person can effect registration of their payment details within the ordering and payment system 502 while at a table T1, using the electronic table mat 504 and/or communication hub device 508. A possibility involves the user accessing an app via their smartphone 511, within which their payment details are already registered, and linking their account with that app to the electronic table mat 504 and/or communication hub device 508.

Following association of the user with a particular electronic table mat system 503, the user is offered access to one or more interaction opportunities, which include (but are not limited to): the opportunity to place an order remotely (without visiting the bar or interacting with bar staff), the opportunity to receive promotions (for example, happy hour offers or cross-selling/up-selling offers), the opportunity to take part in competitions and activities (for example, to enter into a raffle within the pub), the opportunity to receive information about upcoming events and offers, the opportunity to monitor spend and/or items ordered.

Referring in particular now to table T2, as user device 512 is associated with electronic table mat 505 and user device 513 is associated with electronic table mat 506, although both electronic table mats 505 and 506 communicate with the ordering and payment system 502 via a common communication hub device 509, orders can be allocated to different registered payment details.

It is also possible for different people to be sat at the same table (whether as part of the same of different groups) and order using the communication hub device but the order to be identified to a particular one of the electronic table mats on that table. For example, an order is received at bar B from table T2. At this point, a bar person may not know which person at that table the order is for, as several electronic table mats 505, 506 are communication with the ordering and payment system 502 the same communication hub device 509. However, after the order has been placed or, for example, when a function within the ordering and payment system 502 is activated to signal that an order is ready to be delivered/collected, the electronic table mat 505 can display a visual indication that an order associated with that electronic table mat 505 is awaited/has yet to be fulfilled. Such an indication may take any of various suitable forms, for example a flashing light, an alphanumeric message, or a static or moving image.

A person may interact an electronic table mat as described herein by any one or more of a variety of ways made possible, for example: pushing a button, moving a switch, rotating a dial, operating a touchscreen that is capable of recognising one or more different gestures (press, swipe etc.), speaking, operating another electronic device that can communicate with the electronic table mat.

In example, an electronic table mat as described herein has the capability to communicate with a point-of-sale display system for use by a beverage vendor as disclosed in United Kingdom Patent No. GB 2521750 B. In such an example, the electronic table mat may communicate with a point-of-sale display apparatus at a draught beverage dispenser directly, or indirectly via a wireless network.

FIGS. 6 to 10 show different examples of an electronic table mat.

Figure 6:
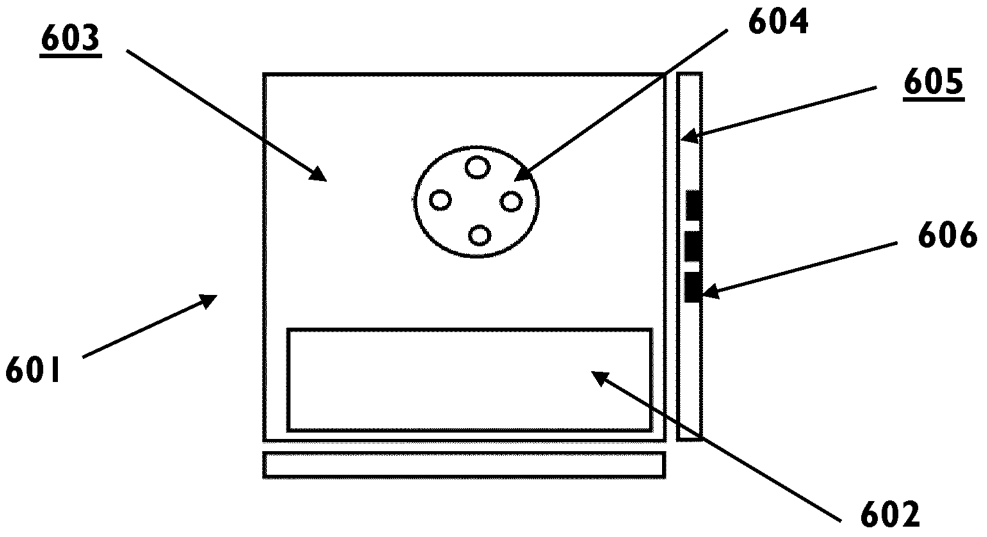
FIGS. 6 to 10 show different examples of an electronic table mat.

In the example of FIG. 6, the electronic table mat 601 is generally square, and has a region 602 of a front face 603 thereof that is an electronic paper panel having touchscreen functionality; this allows both for a visual output to be displayed to a user and for a user to input selections/confirmation of selections. The electronic table mat 601 features an illumination arrangement 604, comprising a plurality of LED lamps. One side 605 of the electronic table mat 601 has a docking station charging point 606.

Figure 7:
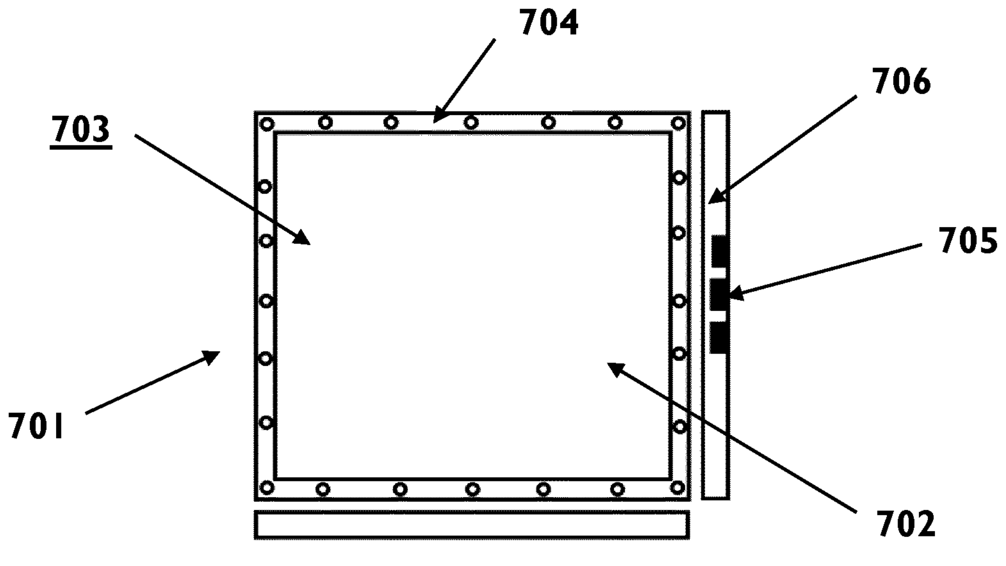
Figure 8:
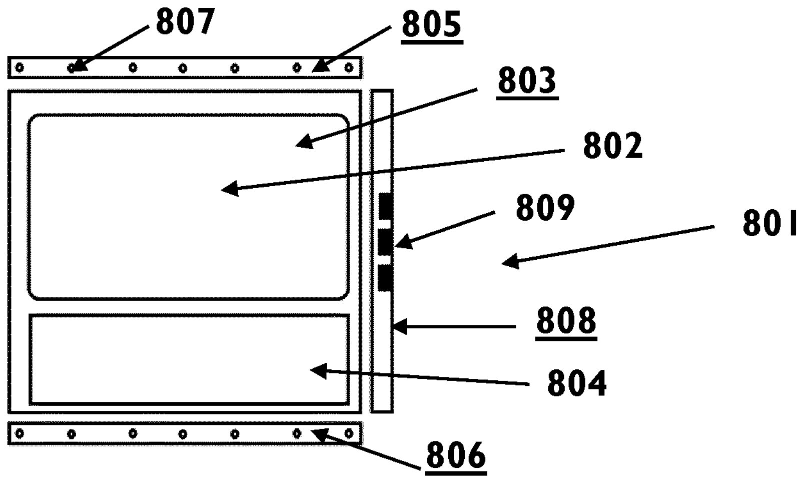
Figure 9:
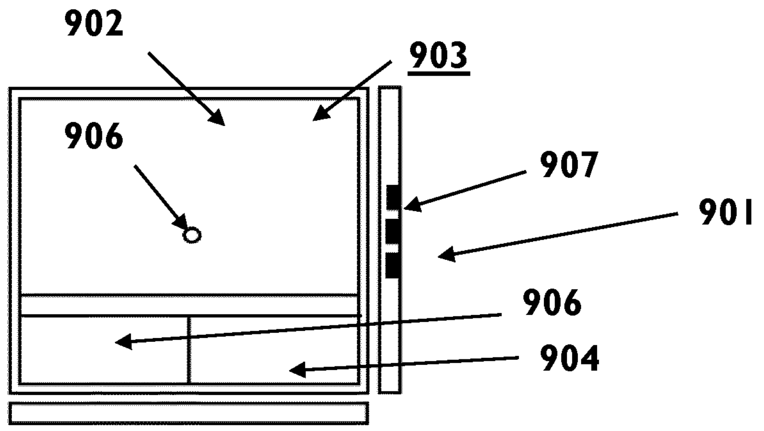

In the example of FIG. 7, the electronic table mat 701 is again generally square. Compared to the electronic table mat 601 of FIG. 6, a region 702 covering almost all of the front face 703 of the electronic table mat 701 is an electronic paper panel having touchscreen functionality. The electronic table mat 701 features an illumination arrangement 704, comprising a plurality of LED lamps, which extends around the periphery of the front face 703. A docking station charging point 705 is provided along one side 706 of the electronic table mat 701.

The example electronic table mat 801 of FIG. 8, is again generally square. A first region 802 of the front face 803 is a touchpad, and a second region 804 of the front face 704 is an electronic paper panel. Two opposite sides 805, 806 are each provided with an illumination arrangement, such as illumination arrangement 807 of side 805, and a third side 808 is provided with a docking station charging point 809.

The example electronic table mat 901 of FIG. 9, is once again generally square. A first region 902 of the front face 903 is a display panel, for showing a visual output, and first and second buttons 904, 905 are provided on the front face 903 for enabling user input. An illumination arrangement 906 is provided for lighting the display panel. A docking station charging point 907 is provided for enabling charging of the electronic table mat 901, and optionally data transfer to and/or from the electronic table mat 901.

Figure 10:
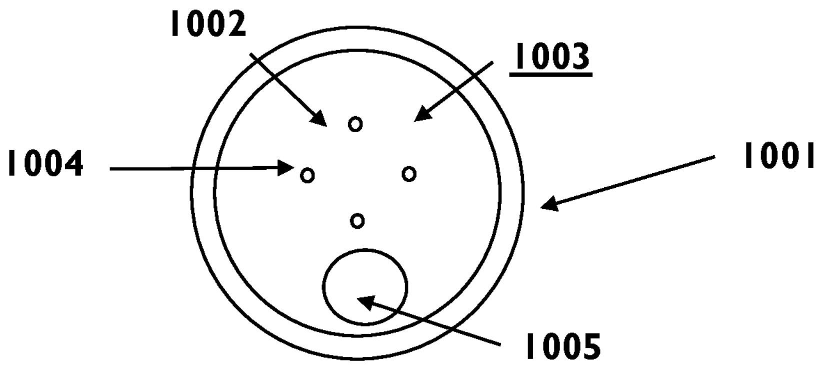

In the example of FIG. 10, the electronic table mat 1001 is generally circular. A region 1002 covering almost all of the front face 1003 of the electronic table mat 1001 is a display panel, and another region 1004 is a touchpad. An illumination arrangement comprising a plurality of LED lamps, such as LED 1005 is provided for lighting the front face 1003. Pins for connecting the electronic table mat 1001 to a docking station are also incorporated (but not shown in this Figure).

The design of an electronic table mat as disclosed herein may thus vary between examples.

One or more display output elements of the display device may be used to provide various different indications, which may or may not require a menu to be navigated to access, including (but not limited to):

Indications relating to device operation: battery status, power remaining, connection status, connection strength Indications relating to consumer order: order paced and awaiting fulfilment, items on order, items previously ordered, order value, total spend in current period, duration of current period, Indications relating to events: notification of winning a prize As previously mentioned, an electronic table mat as described herein may communicated with a user terminal of a content management system.

While an electronic table mat as described herein can be associated with a unique device identifier, the electronic table mat can be associated can be associated with a group identified that one of more other electronic table mats can be associated with.

Thus, within an establishment in which there are a plurality of the electronic table mats, content to be displayed by the electronic table mats may be distributed to the electronic table mats on an individual or group basis.

It is also envisaged that a plurality of electronic table mats as described herein could be distributed across different outlets, rather than all being in the same outlet. However, by means of associating each electronic table mats with the same content management system, whether individually and/or in groups, content to be displayed by electronic table mats in different outlets, as well as those in the same outlet, can be updated wirelessly at the same time.

A content management system with which a plurality of electronic table mats as described herein can be associated, can be setup to allocate different permission levels to different users of an account within the content management system, with each different permission level granting different access to available functions.

For example, a company could own a chain of retail outlets distributed across a country, with the retail outlets being divided into different geographical areas, and with a retail outlet manager being associated with each of the retail outlets and a regional manager being associated with each of the geographical areas. Each retail outlet manager could be granted a first permission level that allows them to control the content and functionality of only the electronic table mats associated with their retail outlet, and each regional manager could be granted a second permission level that allows them to control the content and functionality of all the electronic table mats associated with geographical area only. A third permission level could then be granted to allow a manager to control the content and functionality of all the electronic table mats in all the geographical areas. Thus, electronic table mats may be controlled by a manager having authority that equates to a "local", "regional", "national" or "global" permission level, a "venue" or "organisation" permission level, or an "individual", "sub-group" or "group" permission level, for example.

As appropriate, a manager may have the option to select a display template for the display device of an electronic table mat. In an example, the data processor is programmable to define a plurality of display regions of a display panel of the display device. The content of the different display regions of the display panel can be managed individually. For example, a display template may be selected that includes top and bottom regions of the display panel, or top, middle and bottom regions of the display panel.

For each display region, a manager may have the option to select a display item. The display item content may be a static presentation or a dynamic presentation. The display item may include textual content and/or graphical content. The display item may include any type of moving imagery, for example motion graphics, motion picture, computer generated animation, stop-frame animation, digital or video recordings. The manager may select for the display panel to continuously display one display item. Alternatively, the manager may select for the display panel to display a sequence of two or more display items.

For a sequence of display items, the manager may have the option to select the order of display items. The manager may have the option to select a transition type. This may allow the user to select such properties of the transition from one display item to another as transition effect and transition duration. The manager may have the option to select timings. This may allow the manager to select such timing properties of display item duration or display item change transition. A manager may have the option to select a schedule for content presentation. This may allow the manager to select particular content to be displayed only between certain hours on certain days. Alternatively, the manager may select for the display screen of one or more electronic devices to be updated immediately.

A content management system may allow a manager to set a schedule for the display of layouts on the display device of an electronic mat, with reference to one or more of the following time conditions, either alone or in any combination: a duration of time (seconds, minutes, hours), a time of day, a day of the week, a week of the month, a month of the year.

Thus, the electronic table mat may be programmable to control such content display parameters as display item content, display item presentation duration, display item transition type, display item presentation schedule. The electronic table mat may be programmable to control other content display parameters not specifically described. Further the electronic table mat may be programmable to control device operation or behaviour parameters, for example display illumination and colour settings, volume settings, power management settings, data transfer settings.

It is to be appreciated that content can be added, modified or deleted, and can be managed in real time. A software application screen for device content management may be accessible from an internet-connected device. The content management facility can allow a manager to control the content of each device independently and/or in linked groups.

It is to be appreciated that the content presented by an electronic table mat as described herein may be used to:

present health and safety messages (display reminders to wash hands, maintain a social distances)

present information to guide a user through placing an order within the establishment present information concerning a food or drink item or product line or range that is on offer or on order (display name, producer, ingredients, alcohol content, price, availability, artwork, related promotions, discounts, vouchers, loyalty scheme enticements)

promote brand awareness (display trade name, logo, branding)

advertise a current or forthcoming product or service offer available in that or a different retail outlet advertise a new venue opening (display name, date, map, venue frontage)

inform, entertain or amuse (display time, countdown clock for happy hour, competition information)

The display device may define any number of display regions, of any size and shape and in any arrangement, and each display region may show any kind of content or combinations of types of content. A sequence of display items may include any number of different display items, which may be shown in a pre-determined order or at random. Displayed content may include lights, text, artwork, static and/or moving images. Displayed content may include information and/or advertising and may, for example, show a QR code for providing a link to a web site, social network, or playback video/audio material.

An electronic table mat as described herein may have any suitable shape, may have any suitable dimensions, and may have any desired appearance. The electronic table mat, in particular the body, may be made from any suitable material or materials, using any suitable process or processes. One or more devices and/or components and/or accessories not described herein may be used with the electronic table mat. In addition, the electronic table mat may have additional functionality to that specifically described herein. An electronic table mat as described herein may be used in any suitable applications in any suitable place.

A communication hub device as described herein may have any suitable shape, may have any suitable dimensions, may have any desired appearance, and may be made from any suitable material or materials, using any suitable process or processes. A communication hub device may be capable of connecting any suitable number of electronic table mats as described herein to any suitable network, using any suitable communication means. A communication hub device as described herein may be fixedly positioned with an environment in which it is to be used, for example mounted to a table or a wall.

Figure 12:
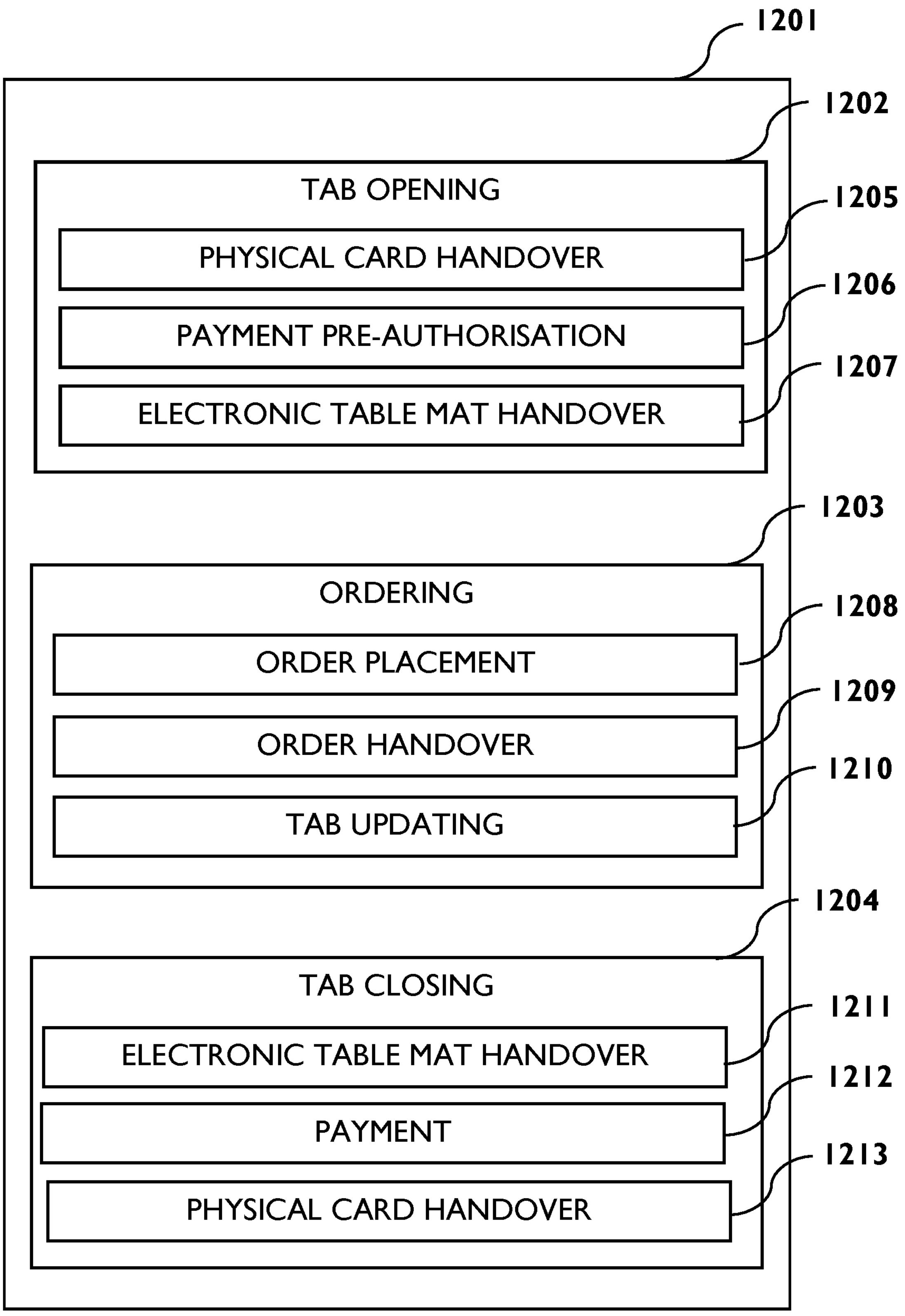
Figure 13:
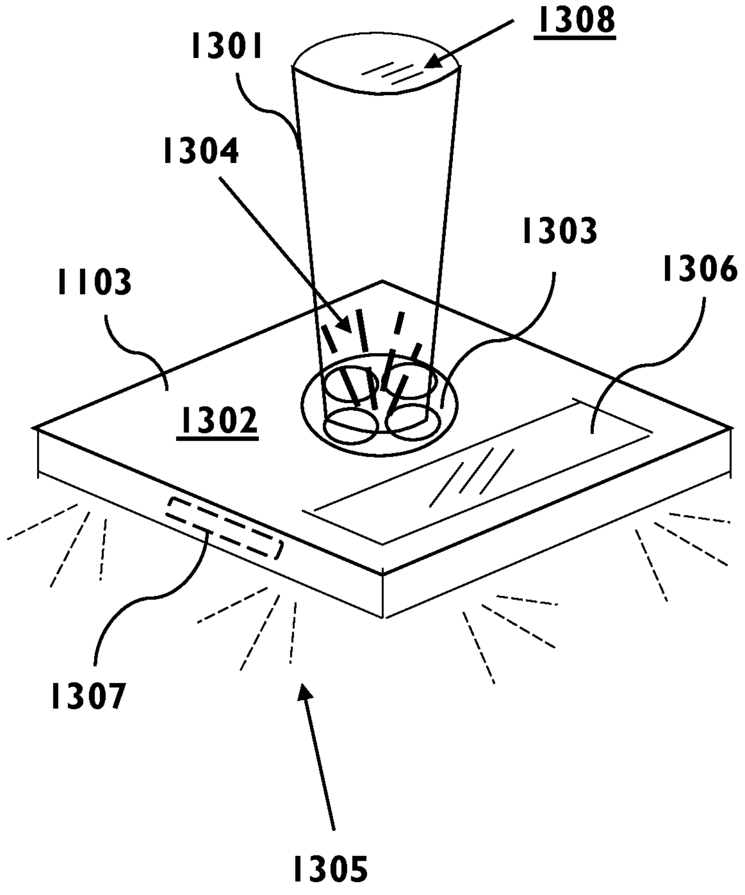

Features of an example ordering system will now be described with reference to FIGS. 11 to 13, and with reference to a typical scenario of use in a retail premises licensed to sell alcoholic beverages.

Figure 11:
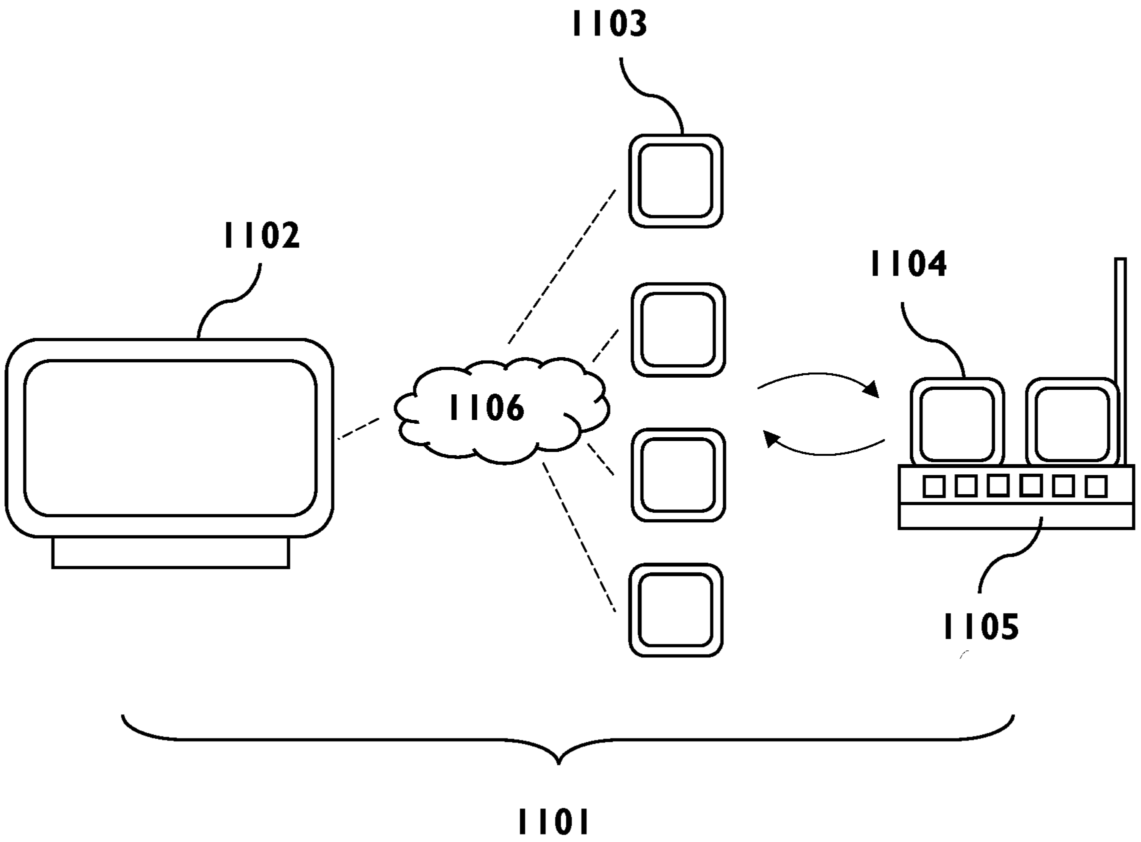
FIGS. 11 to 13 illustrate features of an example ordering system.

Referring now to FIG. 11, an ordering system 1101 comprises a user terminal 1102 ("hub") and a plurality of electronic table mats 1103, 1104 ("beer mats"). In this specific example, the ordering system 1101 further comprises an electronic table mat charging device 1105 ("docking station"). The beer mats 1103, 1104 are arranged for two-way communication with the hub 1102, via a wireless network 1106, and via a wireless communication device thereof, such as wireless communication device 1107 of beer mat 1103, and a wireless communication device 1108 of the hub 1102, with each beer mat 1103, 1104 being associated with a unique identifier. Preferably, and in this example, the docking station 1105 is configured for charging two or more of the beer mats 1103, 1104 simultaneously.

In a specific example, the hub has a touch screen display for controlling media messages to be pushed to the beer mats, for controlling illumination patterns of the beer mats (via smart LEDs contained in them), for controlling notifications, and for displaying order quantities and bills, and the beer mats have a touch screen display (or display screen and buttons) for enabling ordering information to be presented and orders to be placed.

Stages and steps in a method 1201 of using the ordering system 1101 will now be described with reference to FIG. 12. The method 1201 generally comprises a tab opening stage 1202, an ordering stage 1203, and a tab closing stage 1204. Thus, in this specific example, the ordering system 1101 incorporates a payment function.

The tab opening stage 1202 comprises a step 1205 during which a customer hands over a payment card, such as a credit card, to a member of staff, a step 1206 during which the member of staff activates a pre-authorisation on the credit card for a predetermined amount, and a step 1207 during which a beer mat is handed over to the customer. The predetermined amount may notionally include a deposit amount for the beer mat in addition to an amount for orders placed. The payment card handed over by the customer is held by the retailer until the beer mat is returned. The payment card may be stored in a card safe or other suitable device for temporarily securely housing such items. The payment card is linked to the beer mat and a location in safe storage prior to the beer mat being passed to the customer. In some applications, the beer mat is handed to the customer with their first ordered drink.

The ordering stage 1203 comprises a step 1208 during which the customer places an order for a drink, which they can do via the beer mat when in possession of this, a step 1209 during which the customer is handed the drink ordered, and a step 1210 during which the open tab is updated.

The tab closing stage 1204 comprises a step 1211 during which the customer hands the beer mat back to the retailer, a step 1212 during which a member of staff ensures that payment is taken to settle the tab, and a step 1213 during which the customer's payment card is handed back to them. After the beer mat has been handed back, the member of staff can place it back in the docking station for charging.

Features of a specific example of beer mat 1103 will now be described with reference to FIG. 13.

In this Figure, a glass 1301 is shown placed upon an upper side of 1302 of the beer mat 1103, more specifically upon a substantially central region 1303 in which the glass 1301 can be illuminated by the beer mat 1103. Illumination of the glass 1301 is indicated generally at 1304 ("glass illumination"), and a backlight illumination is indicated generally at 1305 ("ambient illumination"). The upper side of 1302 of the beer mat 1103 also includes a touch screen display 1306. Further, the beer mat 1103 incorporates a weight sensor, indicated at 1306 (this would typically be positioned beneath the region 1303). The glass illumination and ambient illumination are each provided by a smart LED arrangement, containing LED lamps that can change colour (for example, between white and red) and change pattern (for example, between continuous and pulsing). The beer mat 1103 may further be provided with a docking station charging point or other device (not visible in this Figure) to enable the beer mat 1103 to be charged by the docking station 1105.

Features of a specific example routine that can be performed by the beer mat 1103 are outlined below.

Initially, the customer has a new drink 1308, in glass 1301 that is placed on the beer mat 1103. The glass illumination 1304 is white, continuous, the ambient illumination 1305 is red, continuous, and the touch screen display 1306 shows a logo associated with the brand of the drink 1308 ("default display").

After some time of the customer supping the drink 1308, the weight sensor 1307 registers that the glass 1301 is nearing empty. At that point, the glass illumination 1304 changes to red, continuous, and the ambient illumination 1305 changes to red, slow pulse. Also, the touch screen display 1306 changes to showing a message ("prompt") asking the drinker if they would like to order another drink (of the same type and quantity) and displaying a region ("yes button") that the drinker can touch to place an order for another drink.

When the customer presses the yes button, thus responding to the prompt in the affirmative, this initiates the sending of a message from the beer mat 1103 to the hub 1102 that another drink has been ordered to be placed on the associated tab. Also, both the glass illumination 1304 and the ambient illumination 1305 change to blue, continuous, and the touch screen display 1306 changes to showing a message ("order confirmation") informing that another drink is on its way. A member of staff will pick up the message sent to the hub 1102, prepare the drink ordered, and add it to the tab associated with the beer mat 1103. In response, both the glass illumination 1304 and the ambient illumination 1305 change to green, continuous, to indicate to a member of staff that the beer mat 1103 is waiting for another drink to be delivered to it and to reinforce to the customer that the order is being dealt with.

When the new drink is placed on the beer mat 1103, the weight sensor 1307 registers the presence of a full glass. At this point, the glass illumination 1304 changes to white, continuous, and the ambient illumination 1305 changes to red, continuous. Also, the touch screen display 1306 changes to showing a message ("wish") inviting the drinker to enjoy their drink. When the drinker lifts the glass from the beer mat 1103, the absence of a glass is registered and this causes the touch screen display 1306 to change back showing the logo associated with the brand of the drink again, thus completing a return to the default display.

It is to be appreciated that different light changes from those specifically described above, from one colour (red, blue, green, white etc.) to another (which may be a change back to a previous colour) and/or from one pattern (continuous, pulsating, flashing etc.) to another (which may be a change back to a previous pattern) may be incorporated in a routine.

The ordering system 1101 is thus usable in a method comprising the steps of: associating a payment card with an individual one of said plurality of electronic table mats, via said user terminal; wirelessly communicating data relating to an input received by said individual one of said plurality of electronic table mats from said individual one of said plurality of electronic table mats to said user terminal; and wirelessly communicating data from said user terminal to said selected one of said plurality of electronic table mats. These steps allow a tab to set up that is associated with the payment card and a selected electronic table mat, allow an order to be placed using that electronic table mat, and allow information to be transmitted to that electronic table mat regarding the status of the order. Other data may be transmitted to the electronic table mat, for example relating to the status of the tab (such as expenditure nearing the pre-authorisation amount), an offer or promotion, or other information for educational or entertainment purposes.

Although illustrative embodiments and examples of the invention have been disclosed in detail herein, with reference to the accompanying drawings, it is to be understood that the invention is not limited to the precise embodiment and examples shown and/or described and that various changes and modifications can be effected therein by one skilled in the art without departing from the scope of the invention as defined by the appended claims.

The invention claimed is:

1. An ordering system comprising:

a plurality of electronic table mats, and a user terminal comprising a wireless communication device for communicating with a wireless communication network;

each said electronic table mat comprising:

a body having a first face, for placing onto a support surface, and a second face, onto which an item can be placed; and an electronic system supported by the body, the electronic system comprising:

a display device comprising at least one display output element, a data processor with access to data storage and for controlling a visual output displayed by the display device;

a wireless communication device for communicating with a wireless communication network;

an input device comprising at least one input element; and a power device;

each said electronic table mat configured for two-way communication with said user terminal via said wireless network, with each said electronic table mat being associated with a unique identifier;

the ordering system configured to allow each said electronic table mat to be managed from the user terminal, the ordering system allowing remote content management of each said electronic table mat, wherein said remote content management allows content to be presented by each said electronic table mat to be added, modified or deleted using said user terminal and said unique identifier;

wherein at least a first of said plurality of electronic table mats and a second of said plurality of electronic table mats are configured to communicate by means of a two-way wireless communication connection between them.

2. The ordering system of claim 1, wherein the display device of each said electronic table mat comprises a display panel having touchscreen functionality.

3. The ordering system of claim 1, wherein said user terminal comprises a display panel having touchscreen functionality.

4. The ordering system of claim 1, wherein the electronic system of each said electronic table mat further comprises a sensing device comprising at least one sensing element.

5. The ordering system of claim 4, wherein the sensing device is a weight sensor.

6. The ordering system of claim 1, wherein the electronic system of each said electronic table mat comprises an audio output device.

7. The ordering system of claim 1, wherein the power device of each said electronic table mat comprises a rechargeable battery.

8. The ordering system of claim 7, further comprising an electronic table mat charging device.

9. The ordering system of claim 8, wherein said electronic table mat charging device is configured for charging two or more of said electronic table mats simultaneously.

10. The ordering system of claim 1, wherein each said electronic table mat has a shape that is one of: generally square, generally circular.

11. The ordering system of claim 1, wherein each said electronic mat comprises at least one illumination arrangement.

12. The ordering system of claim 1, and a communication hub device comprising a wireless communication device for communicating with a wireless communication network, wherein at least one said electronic table mat is configured to communicate with said user terminal via said communication hub device.

13. The ordering system of claim 1, usable in a method comprising the steps of:

associating a payment card with an individual one of said plurality of electronic table mats, via said user terminal;

wirelessly communicating data relating to an input received by said individual one of said plurality of electronic table mats from said individual one of said plurality of electronic table mats to said user terminal; and wirelessly communicating data from said user terminal to said selected one of said plurality of electronic table mats.

14. The ordering system of claim 1, wherein at least a first of said plurality of electronic table mats and a second of said plurality of second electronic table mats are associated with a common group identifier, and wherein said remote content management allows content to be presented by the electronic table mats associated with the common group identifier to be added, modified or deleted using said user terminal and the common group identifier.

15. The ordering system of claim 1, wherein each said electronic table mat is a beverage coaster.

16. The ordering system of claim 1, wherein each said electronic table mat is a beverage coaster.

17. The ordering system of claim 1, wherein each said electronic table mat is a beverage coaster.

18. The ordering system of claim 14, wherein each said electronic table mat is a beverage coaster.

19. An ordering system comprising:

a plurality of electronic table mats, and a user terminal comprising a wireless communication device for communicating with a wireless communication network;

each said electronic table mat comprising:

a body having a first face, for placing onto a support surface, and a second face, onto which an item can be placed; and an electronic system supported by the body, the electronic system comprising:

a display device comprising at least one display output element, a data processor with access to data storage and for controlling a visual output displayed by the display device;

a wireless communication device for communicating with a wireless communication network;

an input device comprising at least one input element; and a power device;

each said electronic table mat configured for two-way communication with said user terminal via said wireless network, with each said electronic table mat being associated with a unique identifier; and the ordering system configured to allow each said electronic table mat to be managed from the user terminal, the ordering system allowing remote content management of each said electronic table mat, wherein said remote content management allows content to be presented by each said electronic table mat to be added, modified or deleted using said user terminal and said unique identifier.

* * * * *